W. H. GREEN
APPARATUS AND METHOD FOR PREPARING AND PROPORTIONING DOSING MIXTURES
July 5, 1932.
Re. 18,510
Original Filed Dec. 15, 1924
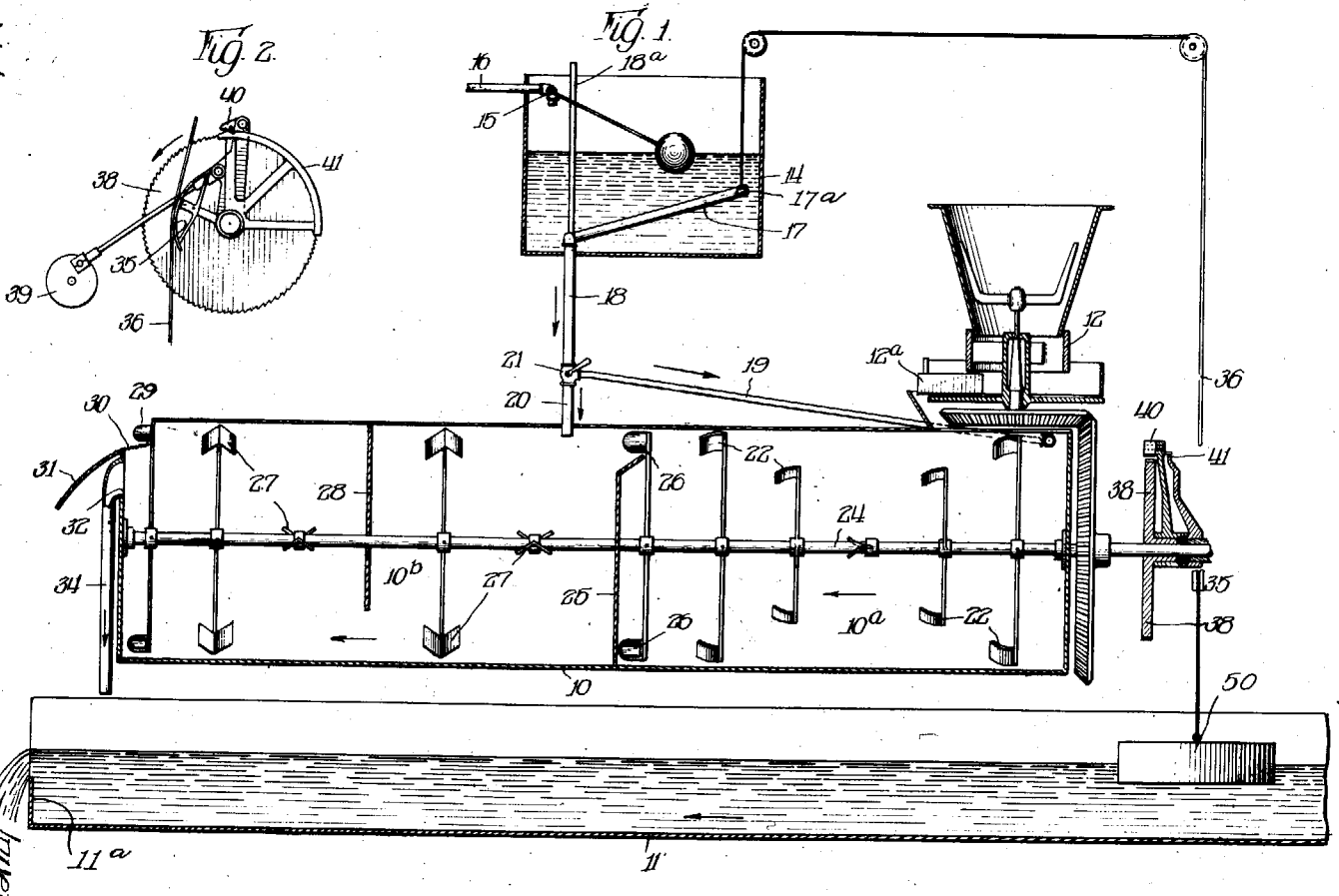
Witness:
R. Burkhardt.
Inventor:
Walter H. Green,
By Cromwell, Reid & Green
Attys.

Reissued July 5, 1932 Re. 18,510

UNITED STATES PATENT OFFICE

WALTER H. GREEN, OF CHICAGO, ILLINOIS, ASSIGNOR, BY MESNE ASSIGNMENTS, TO GENERAL ZEOLITE COMPANY, OF CHICAGO, ILLINOIS, A CORPORATION OF ILLINOIS

APPARATUS AND METHOD FOR PREPARING AND PROPORTIONING DOSING MIXTURES

Original No. 1,722,571, dated July 30, 1929, Serial No. 755,837, filed December 15, 1924. Application for reissue filed July 29, 1931. Serial No. 553,866.

This invention relates to porportionate feed apparatus for combining different materials in predetermined proportions and in which the rate of supply of one of the materials is regulated or controlled in accordance with the rate of supply of the other, so that the combining of the materials may be carried on continuously and in constant proportion irrespective of variations in the rate of supply of the control material. It finds a particular application in the feeding of reagents to water, incident to treatment for removal of hardening or scale forming ingredients. It has to do, however, with more than the mere proportioning of the materials, as it involves also the preparation of the treating or dosing mixture, with the purpose of controlling or regulating the rate at which it is prepared, in accordance with the rate of supply of the water to be treated.

The rate at which water is supplied for commercial use, such as for steam making, laundering or the like, is subject to variation in the demand or requirements and in the supply pressure. Proper and uniform treatment of the water requires uniformity in the proportioning of the treating material to the raw water. Of course, a large supply of treating material may be made up ahead of time to be drawn upon in accordance with the momentary demand over a period of time. That procedure, however, requires a large storage space for the prepared materials and a fore-hand knowledge of the approximate requirements.

It is an object of the present invention to obtain the desired result in proportionate combining of materials more directly, by controlling automatically the preparation of the treating mixture directly from the raw commercial materials. The material most generally used in the treatment of water is lime. In its hydrated form this material may be handled with comparative facility in the preparation of a suitable mixture which consitutes the reagent with which the raw water is dosed. Considerations of economy, however, urge the purchase of the lime in the unhydrated form, as it is more economical both in purchase price and cost of transportation.

Another important object of the invention, therefore, is the preparation of a suitable treating mixture from unslaked lime by method of procedure which is continuous, sufficiently rapid to meet the requirements of the water supplied for treatment and susceptible of automatic control in accordance with the rate at which the water is supplied.

Inasmuch as unslaked lime in its crude commercial form customarily contains more or less refuse matter in the form of gravel, sand and unreduced limestone, it is important that provision be made for the separation of these from the end product. Consequently one of the objects of the invention is an apparatus in which that result may be attained in such fashion as to permit continuous operation of the apparatus through extended periods of time.

Other and further objects of the invention will be pointed out hereinafter, indicated in the appended claims or obvious to one skilled in the art upon an understanding of the present disclosure. For the purpose of this application I have elected to explain the invention by reference to an illustrative structure. It is to be understood, however, that the representation of means is merely diagrammatic or schematic, as the results may be attained in substantially the same fashion by various organizations of divers mechanical elements and devices now known in the art.

In the drawing forming a part of this specification:

Fig. 1 is a diagrammatic illustration representative of a longitudinal sectional elevation of apparatus illustrating the practice of the invention.

Fig. 2 is an elevation detail of speed control mechanism.

The nature of the invention probably will best be understood by reference to the illustrative means. Referring to the drawing, let it be understood that the numeral 10 designates a tank of horizontal elongated proportion and of semi-cylindrical sectional form. Reference character 11 designates a conduit or handling container for raw water supplied for treatment which is provided with an overflow $11^a$. Reference character 12 designates generally a feeding device operable to feed lime into the tank 10, the rate of feed being determined by the speed at which the device is operated and the adjustment of a discharge element $12^a$. A device of this general type is known in the art, but it is here presented simply as illustrative of any suitable form of controlled feed supply mechanism. Reference numeral 14 designates a water supply apparatus, the same being represented in the form of a tank in which a constant level of water is maintained through operation of the float controlled valve 15 of a supply line 16. This water supply device includes a variable discharge element 17, represented as a swinging outlet pipe, the inlet end of which is provided with an inlet orifice and may be raised and lowered in the water in tank 14 so as to vary the head on the orifice and thereby vary the rate of discharge therethrough. Water discharged through pipe 17 is delivered to pipe 18 and divided between pipes 19 and 20 in accordance with the setting of a regulating valve 21. Pipe 18 has an air vent $18^a$ to allow for air compensation in pipes 17 and 18. Pipe 19 leads to the supply end of the tank 10, so that the water delivered thereby will be brought into contact with the unslaked lime supplied by the device 12. The setting of the regulating valve 21 is such as to apportion to the pipe 19 an amount of water adequate to hydrate the lime at the rate at which it is supplied by the supply mechanism 12, and to form a plastic mixture with it, but without materially reducing the heat generated by the reaction of the water and the lime. Of course this amount of water is very much less than that necessary to form the desired treating material, but the purpose of so limiting it is to permit the slaking process to proceed at the most expeditious rate. The water and the lime are agitated and mixed together by stirring members 22 which are actuated by the shaft 24. These stirring members are formed so as to induce a gradual progressive feed of material away from the supply end of the tank and toward a partition 25. The length of the tanks is such that when the mixture reaches the partition 25 it is in a uniform plastic condition and the lime is hydrated. The shaft actuates the revolving dippers 26 which dip the mixture out of the slaking compartment $10^a$ and discharge it over the partition 25 into the mixing compartment $10^b$. The discharge capacity of the dippers 26 is adequate to handle the maximum supply capacity of the mechanism 12 and pipe 19 during a given period of time at a correlative speed. The capacity of the dippers to discharge material from compartment $10^a$ must be greater than the rate of supply of materials into the compartment. This is so that there will be no tendency for material to collect in quantities in chamber $10^a$. The material should be discharged into $10^b$ as soon as the slaking operation has been completed. The actual discharge capacity of the dippers 26 depends upon the rate of revolution in the shaft 24 and size of the dippers. The rate of revolution in this shaft is proportionate to the rate at which the materials are supplied to slaking chamber $10^a$. There is no limit to the size or holding capacity of the dippers 26, except a restriction due to the size of the apparatus, for they cannot feed material out of chamber $10^a$ any faster than it comes to them. In preferred construction they should come up about half or two thirds full. It is important that they should never come up completely filled, incapable of elevating and transferring more material since if this was the case there would be inevitably a building up of materials in the chamber $10^a$. Here it is mixed with a much larger proportion of water, supplied through the pipe 20, and stirred up by the action of the beaters 27 to form a homogeneous liquid, or milk of lime, which it is now qualified to do readily by virtue of the hydrated condition of the lime. This milk of lime seeks its level in the mixing compartment $10^b$, the baffle 28 being interposed in the compartment to prevent the passage of the incoming water directly to the discharge end of the compartment. Any refuse, such as gravel or sand, which is fed in with the unslaked lime, is fed along with the materials incident to the slaking operation in compartment $10^a$, and is discharged therewith into compartment $10^b$. In the latter compartment it sinks to the bottom of the tank, and is fed along the same gradually by the action of the beaters, passing under the baffle 28, and ultimately reaches the discharge end of the tank. Here it is picked up, little by little, by the revolving dippers 29 and discharged over the screen 30 to the chute 31, by which it is conducted off, any of this milk of lime taken up by the dippers returning to the tank through the screen. Tank 10 is provided with a discharge over a long horizontal edge 32 across the width of the tank, which permits passage of the treating mixture from the compartment $10^b$ to the feed pipe 34, whence it is conducted to the water to be treated. Obviously the rate of discharge over the edge 32 will depend upon the rate at which materials are supplied into compartment $10^b$. This is determined by the rate of supply from the feeding means 12 and tank 14. The rate of feed of the slaked lime to compartment $10^a$ is dependent on the speed of the shaft 24, and the setting of the element $12^a$, while the rate of water feed is dependent on the elevation of pipe 17. Consequently, in order to accommodate the varying requirements for treating liquid, there must be variations in the rate at which the unslaked lime and the water are supplied to the mixing compartments. The latter is taken care of by the adjustment of the orifice 17[a] at the end of pipe 17. The amount of liquid flowing into pipe 17 through the orifice 17[a] will be controlled by the elevation of the orifice in the tank 14. The elevation will determine the head of liquid upon the orifice 17[a] at the end of pipe 17. There is provided a free discharge of water into the air at the outlet side of the orifice (that is on the inside of the pipe) and this will continue so long as the pipe 17 and the other pipes farther on are sufficiently large so that the liquid flowing through the orifice is carried away without filling them. Since a restriction may be introduced farther along the pipe by the valve 21 the vent 18[a] is provided attached to top of pipe 18 and extending above the liquid level in 14. This will admit air into pipe 18. As long as the valve 21 is open sufficiently to permit the liquid to discharge through it faster than it enters the orifice 17, the variation in water supply will be controlled satisfactorily. The variations in the rate of supply of unslaked lime are taken care of by variations in the speed of the supply mechanism 12. The latter is made to vary with the speed of the shaft 24, which speed also determines the rate at which the materials are fed longitudinally in the slaking compartment 10[a] and delivered to compartment 10[b].

In order that these variations, which have the final objective of varying the rate of discharge of the treating mixture from mixing compartment 10[b], may be effected automatically and in accordance with the variations in the rate of raw water supply, regulating mechanism is provided which is responsive to the rate of water supply. This is illustrated by the float 50 which rises and falls with variations in the water supply, and which is connected by suitable transmission means 36 with the discharge pipe 17 and with speed control mechanism which regulates the speed of the shaft 24. The speed control mechanism is represented in Fig. 2 by ratchet wheel 38 connected with shaft 24, an actuating wheel 39 which is constantly driven from a suitable source of power to oscillate a dog 40 to rotate the ratchet wheel, and throw-off element 41, the position of which is variable to regulate the effective throw of the dog through movement of a sector plate 35 by the transmission means 36. The weight of the swinging lead pipe 17 and the weight of the float 50 are adjusted so that the float, buoyed by the body of liquid in the container 11, will just about balance the swinging pipe submerged in the body of liquid in the container 14. The amount of friction encountered by the transmission means 36 in passing over the pulleys and the sector plate 35 will prevent any movement thereof without a change in the level of the liquid in the tank 11 and a resultant change in the position of the float 50. The transmission means 36, which consists of a wire or cord is maintained in such frictional relationship with the sector 35 that a movement of the transmission means 36 will result in a corresponding movement of the sector 35. Since the sector 35 is rigidly attached to the throw-off element 41, the throw-off element will be correspondingly shifted in position with every movement of the transmission means 36. The position of the throw-off element 41 will determine the amount of movement of the ratchet wheel 38. The movement of the ratchet wheel 38 results from the movement of the dog 40 to the left while in operating engagement with the teeth on the periphery of the ratchet wheel 38. The movement of the dog is constant but the portion of the movement in which it is in operating engagement with the ratchet wheel 38 may be varied by changing the position of the element 41. If the throw-off element 41 were moved farther to the left than as shown in Figure 2, the portion of the throw of the dog 40 in which it was in engagement with the ratchet wheel 38 would be decreased. It is possible to move the element 41 far enough to the left so that the dog 40 will be kept out of engagement with the ratchet wheel 38 during its entire movement. This would result in a stoppage of the apparatus. On the other hand, if the throw-off element 41 were moved farther to the right, than shown in Figure 2, the motion of the ratchet wheel 38 would be increased since the dog 40 would be in actuating contact therewith for a greater arc. It is apparent that if the element 41 is moved far enough to the right, it would be possible for the dog 40 to be in actuating relation with the ratchet wheel 38 during its entire leftward movement.

The operation of the speed regulating devices shown upon Figures 1 and 2 is readily apparent. The liquid in the container 11 represents the raw water. The raw water flows toward the left and milk of lime is added to it at a point below the pipe 34. The mixture finally flows over a weir or some other retarding means 11a at the left end of the container 11. The level of liquid in the container or conduit 11 will correspond to the rate of flow therein and will bear some fixed relationship thereto.

It is obvious that with an increased rate of flow it is desirable to add more milk of lime to the water while with a decreased rate of flow it will be desirable to add less milk of lime to the water. This is accomplished in the following manner: If there is an increased rate of flow, the level in the container or conduit 11 will be higher, raising the float 50. Whereupon the transmission means 36 will move the throw-off element 41 to the right (see Figure 2) and at the same time will cause a lowering of the inlet orifice 17ᵃ of pipe 17 in tank 14. The movement of the throw-off element 41 to the right will cause the dog to remain in actuating engagement with the wheel 38 for a longer portion of its throw. This will cause a faster movement of shaft 24 and an increase in the rate of feed of lime to the chamber 10ᵃ. The lowering of the orifice 17ᵃ will also increase the head of liquid thereupon, which in turn will increase the amount of water flowing down through lines 18, 19 and 20. As a result, more lime will be slaked in chamber 10ᵃ, more slaked lime will be converted into milk of lime in chamber 10ᵇ, and more milk of lime will flow over the orifice 32 into the conduit 34 and finally into the raw water passing through the conduit 11.

If the raw water passing through the conduit or container 11 decreases, the level of liquid will decrease and the float 50 will be lowered. Whereupon the transmission means 36 will elevate the swinging pipe 17 and will move the throw-off element 41 to the left. The elevation of the inlet orifice in the swinging pipe 17 will decrease the head thereupon and result in a decreased flow of slaking and diluting water through lines 19 and 20 respectively. The movement of the throw-off element 41 to the left will decrease the arc in which the dog 14 is in actuating engagement with the ratchet wheel 38 and this will decrease the speed of the shaft 24. With the decrease in the speed of the shaft 24, less unslaked lime will be fed into the slaking chamber 10ᵃ, less slaked lime will be fed into the diluting chamber or milk of lime chamber 10ᵇ by means of the cups 26, and less milk of lime will flow over the horizontal orifice 32 to be intermixed with the water flowing through the conduit 11. When the flow of liquid through the conduit 11 has ceased, the float 50 will ride in such a lowered position that the transmission means 36 will lift the orifice 17ᵃ out of the body of liquid in the basin 14 and will also move the throw-off element 41 a sufficient distance to the left to prevent the dog 40 from coming into actuating engagement with the ratchet wheel at any portion of its throw. As a result, no water will flow through lines 18, 19 or 20, no unslaked lime will be fed into the slaking chamber 10ᵃ and no slaked lime will be fed into the diluting chamber 10ᵇ. The power shaft on which the power wheel 39 is positioned is separately controlled and may also be stopped by means not shown.

As long as the dog 40 is out of actuating engagement with the ratchet wheel 38 no movement of the shaft 24 will take place since the pedals are immersed in thick heavy lime in chamber 10ᵃ. The resistance of the semi-solid in chamber 10ᵃ and the liquid in chamber 10ᵇ will be sufficient to stop rotation immediately upon release of the pawl or dog 40.

It will be noted that not only the supply of raw materials is automatically regulated and controlled in accordance with the variations and supply of raw water, but also the rate at which the materials are transmitted through the apparatus and the refuse removed is controlled thereby. The final result is the automatic control of the feed of the dosing mixture to the raw water in accordance with the rate at which the latter is supplied.

Of course, it is not essential that the regulation of the lime and water feed be controlled automatically. By a fixed setting of means 36 or of the element 41 and pipe 17, so as to eliminate the control by float 50, the feed of material may be held constant, with the result that the discharge from compartment 10ᵇ will be held constant. In such arrangement, it will be observed, the feed of the treating material is controlled by the rate of feed of the unslaked lime and water to the apparatus.

I claim:

1. A method of preparing and proportioning a dosing mixture, comprising feeding unslaked lime and water together in predetermined proportion at a rate controlled by the raw water supply, stirring the water and lime to induce hydration of the latter, feeding the slaked lime and more water at a rate corresponding to that of the original lime and water supply, agitating the slaked lime and water to form milk of lime and delivering the latter to the raw water at a rate corresponding to its rate of preparation.

2. A method of preparing and proportioning a dosing mixture which comprises slaking lime, adding water thereto and agitating to form milk of lime, feeding the latter to the raw water in accordance with the rate at which it is prepared, and controlling said feeding by the rate of flow of the water to be dosed.

3. A method of preparing and proportioning a dosing mixture, comprising slaking lime with water, mixing the slaked lime with more water to make milk of lime, feeding the mixture to the raw water, controlling the rate of such feeding by the rate of lime and water supply, and proportioning the rate of lime and water supply to the rate of raw water feed.

4. A method of preparing and proportioning a dosing mixture, comprising feeding lime and water together to hydrate the lime, feeding the hydrated lime and water together to form milk of lime, delivering the latter at its rate of preparation, and proportioning the lime and water feed to the raw water supply.

5. A method of preparing and proportioning a dosing mixture, comprising feeding unslaked lime and water together to slake the lime, governing the feed of water and lime by the raw water feed, mixing the slaked lime and water to form milk of lime, removing refuse from the mixture incident to its preparation, and delivering the mixture to the raw water in conformity with its rate of preparation.

6. A water softening process which comprises providing supplies of raw water to be treated, unslaked lime to be prepared for admixture with such raw water, and water to be admixed with the lime during such preparation, admixing the unslaked lime and the last mentioned water at a rate proportionate to the rate of supply of the raw water, adding further qauntities of the same water to the resultant mixture and then adding the final mixture to the raw water supply.

7. A water softening process which comprises providing supplies of raw water to be treated, unslaked lime to be prepared for admixture with such raw water, and water to be admixed with the lime during such preparation, admixing the unslaked lime and the last mentioned water in quantities insufficient to decrease materially the heat of the resulting reaction at a rate proportionate to the rate of supply of the raw water, adding further quantities of the same water to dilute the resultant mixture and then adding the final mixture to the raw water supply.

8. A water softening process which comprises providing supplies of raw water to be treated, unslaked lime to be prepared for admixture with such raw water, and water to be admixed with the lime during such preparation, admixing the unslaked lime and the last mentioned water in quantities sufficient to slake the lime without excessively diluting the resultant slaked lime at a rate proportionate to the rate of supply of the raw water, adding further quantities of the same water to dilute the resultant mixture and then adding the final mixture to the raw water supply.

9. A water softening process which comprises providing supplies of raw water to be treated, unslaked lime to be prepared for admixture with such raw water, and supplies of water to be admixed with the lime during the different stages of such preparation, adding together the unslaked lime with sufficient water to slake the same, adding together sufficient water and the slaked lime to form milk of lime, adding the final mixture to the raw water supply and regulating the addition of water to the unslaked lime to form slaked lime, the addition of water to the slaked lime to form milk of lime, the addition of unslaked lime to form slaked lime, the addition of slaked lime to form milk of lime and the addition of milk of lime to the raw water to be treated by the rate of flow of the raw water.

10. A water softening process which comprises providing supplies of raw water to be treated, unslaked lime to be prepared for admixture with such raw water, and supplies of water to be admixed with the lime during the different stages of such preparation, adding together the unslaked lime with sufficient water to slake the same, adding together sufficient water and the slaked lime to form milk of lime, adding the final mixture to the raw water supply and regulating the addition of water to the unslaked lime to form slaked lime, the addition of water to the slaked lime to form milk of lime, the addition of unslaked lime to form slaked lime, and the addition of slaked lime to form milk of lime by the raw water supply and converting the slaked lime into milk of lime and adding the milk of lime to the raw water supply substantially as soon or shortly after they are formed without storing any substantial amounts of the same.

11. A water treating apparatus, comprising an extended lime slaking tank, means for adding a supply of unslaked lime to one end of said tank and for adding thereto a quantity of water sufficient to slake the lime and to form therewith a relatively heavy milk of lime, agitating means for forming an intimate mixture of said lime and water and for conducting said mixture progressively toward the opposite end of said tank, discharge means communicating with said opposite end of the tank, means for diluting the milk of lime mixture discharge from said last-named means with a further quantity of water, a raw water supply, and means for adding said diluted mixture to the raw water supply.

12. A method of treating water, which comprises continously feeding unslaked lime and water together at set rates to slake the lime and form therefrom a fluid slaked lime-water mixture, agitating the materials while undergoing the slaking reaction, continuously removing the fluid slaked lime-water mixture from the slaking zone at the rate it is being slaked while continuously separating refuse from the fluid slaked lime-water mixture, continuously mixing additional water with the removed mixture to produce therefrom a diluted lime suspension, and continuously delivering the diluted lime suspension at the rate of its production to the water to be treated 13. A water treating process, which comprises slaking lime with water, mixing the slaked lime with more water to form milk of lime, feeding the milk of lime to the raw water, controlling the rate of such feeding by the rate of lime supply and water, and proportioning the rate of lime supply to the rate of raw water feed.

14. A water treating process, which comprises continuously slaking lime with water, mixing the slaked lime with more water to form milk of lime, continuously feeding the mixture to the raw water, and proportioning the rate of lime supply to the rate of raw water feed.

15. A method of treating water, which comprises continuously feeding unslaked lime and a relatively small amount of water together at set rates to hydrate the unslaked lime and to form therewith milk of lime, the proportions of unslaked lime and water being such as to maintain in the slaking zone a substantially increased temperature from the reaction of the materials, agitating the materials while undergoing the slaking reaction, continuously removing the milk of lime from the slaking zone at the rate of its formation, and continuously supplying the milk of lime to the water that is to be treated at the rate that the milk of lime is removed from the slaking zone.

16. A method of treating water, which comprises maintaining a body of milk of lime at an elevated temperature, continuously feeding unslaked lime and water together and into said body of milk of lime to hydrate the unslaked lime and to form therewith additional milk of lime, agitating the materials while undergoing the slaking reaction, continuously removing milk of lime from said body at the rate of its formation, and continuously supplying the removed milk of lime directly to the water to be treated at the rate of its removal.

17. A method of treating water, which comprises maintaining a body of milk of lime, continuously feeding water and unslaked lime containing insoluble refuse together and into said body of milk of lime to hydrate the unslaked lime and to form additional milk of lime, agitating the materials undergoing the slaking reaction, separating the refuse from the milk of lime, continuously removing milk of lime from said body, and continuously supplying the removed milk of lime directly to the water to be treated.

18. A method of treating water, which comprises maintaining a body of milk of lime, continuously feeding unslaked lime and a relatively small amount of water into said body of milk of lime to hydrate the unslaked lime and to form additional milk of lime, the proportions of unslaked lime and water being such as to maintain the slaking zone of said body of milk of lime at a substantially increased temperature from the reaction of the materials, agitating the materials during the slaking reaction, continuously removing milk of lime from said body, and continuously supplying the removed milk of lime directly to the water to be treated.

19. A method of treating water, which comprises continuously feeding unslaked lime and a relatively small amount of water together at set rates to hydrate the unslaked lime and to form therewith milk of lime, the proportions of unslaked lime and water being such as to maintain in the slaking zone a substantially increased temperature, agitating the materials while undergoing the slaking reaction, continuously removing the milk of lime from the slaking zone, adding more water to said removed milk of lime, and continuously adding the milk of lime directly to the water to be treated.

20. A water treating apparatus, comprising a tank for holding a substantial quantity of liquid, means for continuously supplying unslaked lime to said tank, means for continuously supplying water to said tank, means in said tank for agitating said unslaked lime and water to hydrate said unslaked lime and to form therewith milk of lime, a raw water supply system, means for continuously adding said milk of lime directly to water in said raw water supply system at the rate of formation of said milk of lime, and means responsive to changes in the rate of flow of raw water through said system for controlling said unslaked lime supply means.

21. Apparatus for treating water, comprising a slaking tank for holding a substantial quantity of liquid, means for adding a continuous supply of unslaked lime in lump form and containing appreciable quantities of insoluble refuse to said slaking tank, means for adding a continuous supply of water to said slaking tank to hydrate said lime and to form therewith milk of lime, a rotatable shaft mounted in said tank, spaced radial arms mounted on said shaft to provide agitating means in said tank, a raw water supply system, and means for continuously adding the milk of lime from the slaking tank directly to the raw water supply system and at a rate substantially equal to the rate of formation of milk of lime.

22. Apparatus for treating water, comprising a tank for holding a substantial quantity of liquid, means for continuously adding a supply of unslaked lime containing appreciable quantities of insoluble refuse to said slaking tank, means for adding a continuous supply of water to said slaking tank to hydrate said lime and to form therewith milk of lime, a rotatable shaft in said chamber, spaced radial arms mounted on said shaft to provide agitating means in said tank, means for removing the refuse from the slaking tank and from the milk of lime, a raw water supply system and means for continuously adding said milk of lime directly to the raw water supply system at a rate substantially equal to the rate of formation of milk of lime.

23. Apparatus for treating water, comprising a tank for holding a substantial quantity of liquid, means for continuously adding a supply of unslaked lime to said tank, means for adding a continuous supply of water to said tank to hydrate said lime and form therewith milk of lime, a rotatable shaft in said tank, spaced radial arms mounted on said shaft to provide agitating means in said tank, means for diluting said milk of lime, a raw water supply system, and means for continuously adding the diluted milk of lime directly to said raw water supply at a rate substantially equal to the rate of formation of milk of lime.

24. A water treating apparatus, comprising an unslaked lime treating tank having an overflow outlet in the upper portion thereof, means for continuously adding a supply of unslaked lime to said tank, means for continuously supplying water to said tank to hydrate said lime and to form therewith milk of lime, a rotatable shaft in said tank, spaced agitators extending from said shaft, and a raw water supply system communicating with the overflow of said tank, said raw water supply system receiving milk of lime displaced from said tank.

25. A water treating apparatus, comprising a tank for holding a body of liquid, means for continuously adding a supply of unslaked lime to said tank, means for adding a continuous supply of water to said tank to hydrate said lime and to form therewith milk of lime, agitating means for said tank, means for removing milk of lime from said tank at the rate of formation of the milk of lime, means for diluting said milk of lime, a raw water supply system, and means for continuously adding the diluted milk of lime directly to said raw water supply system.

In testimony whereof, I have hereunto subscribed my name.

WALTER H. GREEN.